US009646330B2

(12) United States Patent
Owens et al.

(10) Patent No.: US 9,646,330 B2
(45) Date of Patent: May 9, 2017

(54) NON-METERED WIRELESS SYSTEM AND METHOD TO RENDER USAGE BASED INVOICES FOR STORAGE TANK CONSUMABLES

(71) Applicants: Loren Owens, Oveido, FL (US); Ken Stauffer, Toms River, NJ (US)

(72) Inventors: Loren Owens, Oveido, FL (US); Ken Stauffer, Toms River, NJ (US)

( * ) Notice: Subject to any disclaimer, the term of this patent is extended or adjusted under 35 U.S.C. 154(b) by 593 days.

(21) Appl. No.: 14/092,988

(22) Filed: Nov. 28, 2013

(65) Prior Publication Data

US 2014/0156478 A1 Jun. 5, 2014

Related U.S. Application Data

(60) Provisional application No. 61/733,602, filed on Dec. 5, 2012, provisional application No. 61/892,043, filed on Oct. 17, 2013.

(51) Int. Cl.
*G07F 19/00* (2006.01)
*H04M 15/00* (2006.01)
*B65B 1/30* (2006.01)
*B65B 3/28* (2006.01)
*G06Q 30/04* (2012.01)

(52) U.S. Cl.
CPC .................................... *G06Q 30/04* (2013.01)

(58) Field of Classification Search
None
See application file for complete search history.

(56) References Cited

U.S. PATENT DOCUMENTS 4,977,528 A * 12/1990 Norris .................. G01F 23/263 340/612
5,263,371 A * 11/1993 Maresca, Jr. ....... G01F 23/2962 181/124
6,532,281 B1 * 3/2003 Schoenborn ............. 379/114.01
2003/0050807 A1 * 3/2003 Hoffman ................ G06Q 10/06 705/7.25
2006/0157142 A1 * 7/2006 Hillam et al. ................ 141/198
2006/0243347 A1 * 11/2006 Humphrey ...................... 141/95
2013/0014855 A1 * 1/2013 Yahashi .................. G01M 3/26 141/1

* cited by examiner

*Primary Examiner* — Ariel Yu
(74) *Attorney, Agent, or Firm* — Beusse, Wolter, Sanks & Maire, PLLC; John L. DeAngelis

(57) ABSTRACT

A method, system and computer-readable medium for managing usage of storage tank consumables in a storage tank are provided. This is achieved by receiving and storing by a central server comprising a processor and a storage device, measurements of storage tank consumables from a remote system associated with a storage tank; periodically calculating by the processor usage-based data for generating invoices for storage tank consumables based on sensor measurements representative of an estimated usage of the storage tank consumables; receiving and storing by the central server a fill value representing an actual usage reported to the central server when the storage tank is filled; and reconciling the estimated usage with the actual usage by the processor by summing all estimated usages since a last fill of the storage tank, calculating a difference between the sum of the estimated usages and the fill value, and issuing a debit or credit based on the difference for reconciliation.

17 Claims, 10 Drawing Sheets

NON-METERED WIRELESS SYSTEM AND METHOD TO RENDER USAGE BASED INVOICES FOR STORAGE TANK CONSUMABLES

CROSS REFERENCE TO RELATED APPLICATIONS

This application claims priority from U.S. provisional application Ser. No. 61/733,602, filed Dec. 5, 2012, and U.S. provisional application Ser. No. 61/892,043, filed Oct. 17, 2013, the disclosures of which are incorporated herein by reference in their entirety.

TECHNICAL FIELD

This invention relates to processing information for storage tank consumables, and specifically to non-metered wireless system, method, and computer-readable instructions for rendering usage based invoices for storage tank consumables.

BACKGROUND

Consumers typically pay for stored consumables like propane and fuel oil on a cash-on-delivery basis. This can be an economic burden to the consumer and the dealer delivering the consumable. If the customer can't afford to fully replenish the consumable item, the dealer is left with the full delivery costs even though only a partial delivery was made. This increases the costs and reduces revenue to the dealer.

Accordingly, there is a need in the art for a system and method to issue usage based bills in order to move consumers to a monthly billing model that doesn't require a meter to be installed.

The present invention is designed to address those needs.

SUMMARY OF THE INVENTION

Broadly speaking, a usage based billing system is provided with a function to true up the actual vs. estimated values upon a consumable delivery.

The invention can be implemented in numerous ways, including as a system, a device/apparatus, a method, or a computer readable medium. Several embodiments of the invention are discussed below.

As a method, an embodiment herein provides for managing usage of storage tank consumables in a storage tank. This is achieved by receiving and storing by a central server comprising a processor and a storage device, measurements of storage tank consumables from a remote system associated with a storage tank; periodically calculating by the processor usage-based data for generating invoices for storage tank consumables based on sensor measurements representative of an estimated usage of the storage tank consumables; receiving and storing by the central server a fill value representing an actual usage reported to the central server when the storage tank is filled; and reconciling the estimated usage with the actual usage by the processor by summing all estimated usages since a last fill of the storage tank, calculating a difference between the sum of the estimated usages and the fill value, and issuing a debit or credit based on the difference for reconciliation.

In further embodiments, the method also provides for one or more of: measuring storage tank consumables via a sensor device of the remote system adapted to measure usage of the storage tank consumables; processing the sensor measurements by a processing device in communication with the sensor device, wherein the processing device is adapted to convert the sensor measurements into a predetermined protocol message for transmission; communicating between the central server and the remote system via a communication interface adapted to transmit the predetermined protocol message; providing a user interface adapted to grant access to data stored and processed by the central server and provide reports based on the data.

In still further embodiments, the method allows for providing storage tank consumable data and customer data graphically via a map displayed on a display device for one or more storage tanks managed by the central server, by generating via the processor a map view comprising icons overlaid on the map based on service addresses, wherein the icons provide selectable links to the storage tank consumable data and customer data, and further wherein the icons are color coded to be indicative of tank level readings.

The method further provides for generating via the processor tank level reports for one or more storage tanks managed by the central server, wherein the tank level reports are adapted to report data that exceeds certain predetermined thresholds and generate a report based on routing zones for tank filling routes. The method further provides for periodically generating via the processor invoices (such as monthly) based on the estimated usage of the storage tank consumables to allow for a plurality of billing cycles between tank fills; wherein after the storage tank is filled, adjusting the next invoice via the processor in order to reconcile the estimated usage with the actual usage.

The above-noted method may be implemented on a non-transitory computer readable medium containing instructions that when executed by a processor perform the method herein.

A system for managing usage of storage tank consumables in a storage tank, is also provided. The system includes a central server comprising a processor and a database adapted to communicate with a processing device of a remote system associated with the storage tank through a communication interface, wherein the processed sensor measurements of the remote system are received by the central server for further processing and storage, wherein the further processing comprises executing a usage based billing process adapted to: periodically calculate usage-based data for generating invoices for storage tank consumables based on sensor measurements representative of an estimated usage of the storage tank consumables; receive and store a fill value representing an actual usage reported to the central server when the storage tank is filled; reconcile the estimated usage with the actual usage by summing all estimated usages since a last fill of the storage tank, calculating a difference between the sum of the estimated usages and the fill value, and issuing a debit or credit based on the difference for reconciliation.

In further embodiments, a remote system associated with the storage tank is also provided which has a sensor device unit adapted to measure storage tank consumables; a processing device in communication with the sensor device adapted process sensor measurements; and a communication interface. The processing device of the remote system is further adapted to convert the sensor measurements into a predetermined protocol message for transmission via the communication interface.

In further embodiments, the usage based billing process of the system is further adapted to: provide storage tank consumable data and customer data graphically via a map displayed on a display device for one or more storage tanks managed by the central server, by generating via the processor a map view comprising icons overlaid on the map based on service addresses, wherein the icons provide selectable links to the storage tank consumable data and customer data, and further wherein the icons are color coded to be indicative of tank level readings.

In further embodiments, the usage based billing process of the system is further adapted to: generate tank level reports for one or more storage tanks managed by the central server, wherein the tank level reports are adapted to report data that exceeds certain predetermined thresholds and generate a report based on routing zones for tank filling routes.

In further embodiments, the usage based billing process is further adapted to: periodically generate invoices based on the estimated usage of the storage tank consumables to allow for a plurality of billing cycles between tank fills; wherein after the storage tank is filled, the usage based billing process is further adapted to adjust the next invoice in order to reconcile the estimated usage with the actual usage.

The advantages of the invention are numerous. One significant advantage of the invention is that it allows for businesses like propane and fuel oil dealers to move customers to a monthly billing model that doesn't require a meter to be installed.

Other aspects and advantages of the invention will become apparent from the following detailed description taken in conjunction with the accompanying drawings, illustrating, by way of example, the principles of the invention.

All patents, patent applications, provisional applications, and publications referred to or cited herein, or from which a claim for benefit of priority has been made, are incorporated herein by reference in their entirety to the extent they are not inconsistent with the explicit teachings of this specification.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1A:
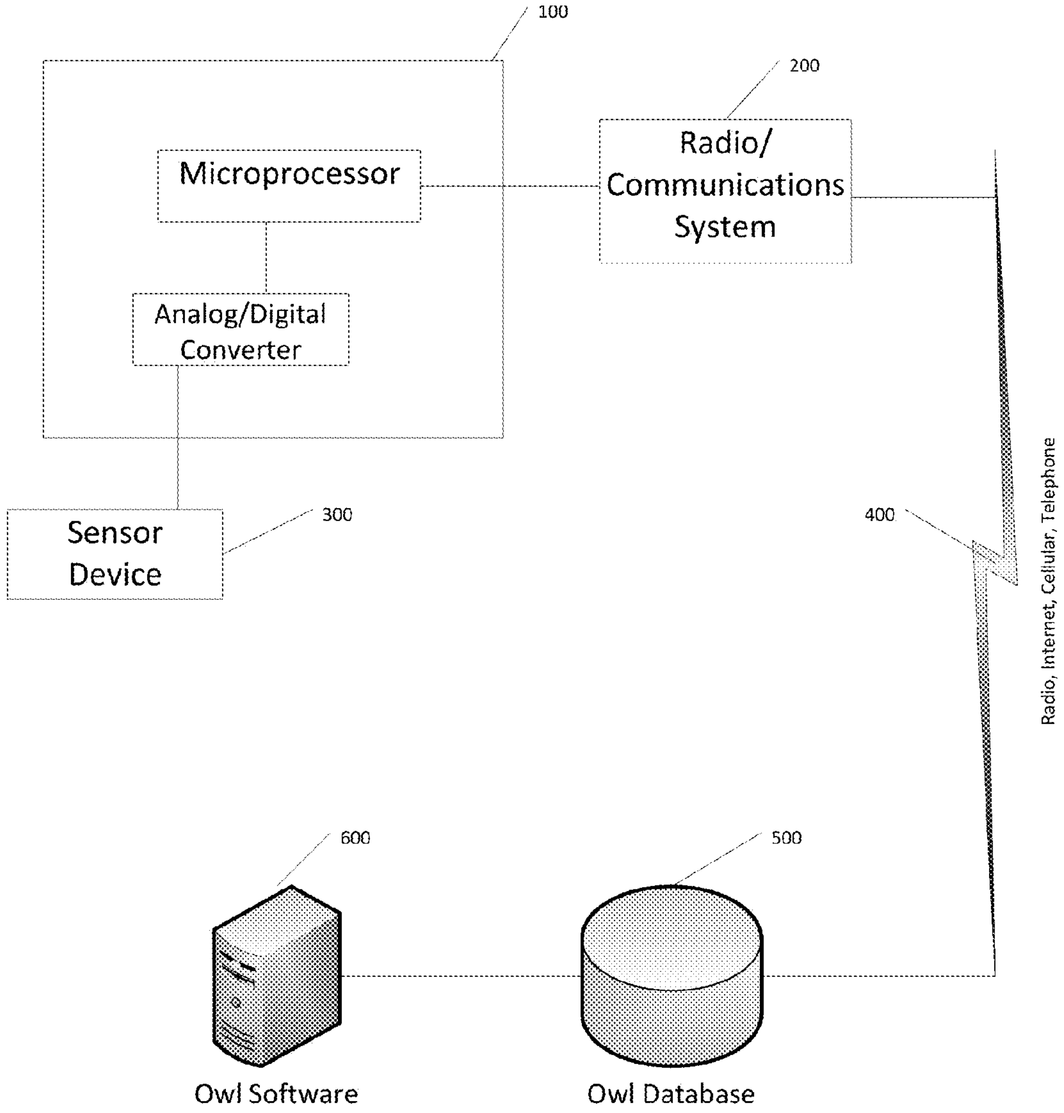
FIG. 1A is a block diagram of hardware architecture of an embodiment.

Referring now to the drawings, the preferred embodiment of the present invention will be described.

FIG. 1A shows an embodiment where the chip unit 100 comprises a microprocessor and Analog to Digital (A/D) Converter which is connected to a Communications system unit 200, which can be a radio or wired device, and also a sensor device unit 300 to enable measurement of monitored device or environment. The purpose of the chip unit 100 is to facilitate interfacing traditionally non-compatible devices. In its initial iteration the chip unit 100 was used to connect a Rochester Hall Effect sensor on a propane tank to a water metering radio and collect data. The chip unit 100 can be adapted to speak multiple protocol language allow it to communicate upstream to many different radio and communication systems via protocols like UART, Sensus, Ethernet, and custom protocols as designed.

Downstream sensor devices unit 300 are typically variable resistance devices or contact closure systems which complete a circuit when an event occurs. The chip unit 100 has multiple Analog to Digital converters (ADC) on board to facilitate reading an analog voltage and converting that voltage into a digital value to be processed later by the software in the web portal unit 600. The current design permits up to 3 ADC connections per chip, but this could be expanded by swapping out the Microprocessor chip to a similar model with a high pin count. The way the sensor device works is the chip unit 100, upon receiving power from the Communications system unit 200 will send voltage of some value to the sensor device unit 300. The sensor device will return some portion of that voltage (0%-100%) which is then used to determine the state of what you are sensing. In the case of a Hall Effect device on a Propane tank dial the return voltage is used to determine the position of the tank float gauge as the percentage of returned voltage is dependent upon the position of the gauge and dial assembly. When the chip unit 100 receives the return voltage is assembles it into a message based on the configured protocol to be transmitted to the Communications System unit 200. Using the propane tank example the voltage is added to the data fields of a modified Sensus protocol messages used in water metering. The protocol was modified to allow for a security checksum to be added to overcome some limitations of the protocol. In this example, the message is transmitted from the Chip unit 100 to the Communications system unit 200 via a UART serial connection. The Communications system unit 200 verifies the checksum and if valid accepts the message and cuts power to the chip unit 100 turning it off to conserve power.

Once a valid message is received from the chip unit 100 by the Communications system unit 200 it will transmit that message to the Database unit 500 via a communications link unit 400 which can be wired or wireless in nature. The Database unit 500 houses received data from a plurality of chips unit 100, Sensors unit 300, and Communications systems unit 200 to be processed by the software unit 600.

The software unit 600 is accessed by customers to view data received from monitored devices, plan service calls, determine consumable usage for billing purposes and monitor inventory levels among other things. The viewing is done via a web portal or Application Programming Interface (API) wherein the user is allowed to view the data associated with his user accounts right and privileges. The Software unit 600 also permits the user to load bulk data into the system for processing and display. This data may include delivery data for consumable items, customer identifying information, or other bulk data to be associated with customer accounts in the system.

One of the most innovative functions of the Software unit 600 is the ability to issue usage based bills with a function to true up the actual vs. estimated values upon a consumable delivery. This functionality allows for businesses like propane and fuel oil dealers to move customers to a monthly usage based billing model that doesn't require a meter to be installed. Start and end values read by the sensor unit 300 and chip unit 100 during a defined billing cycle can be used to determine a total amount of consumable product used. This data can then be used to render an invoice for that month the same as common utilities like Electric and Water. This eases the burden on the consumer who typically pays for consumables on a Cash on Delivery (COD) basis which can be an economic burden to the consumer and the dealer delivering the consumable. If the customer can't afford to fully replenish the consumable item the dealer is left with the full delivery costs even though only a partial delivery was made. This increases the costs and reduces revenue to the dealer. By converting to a usage billing model the dealer is able to optimize delivery schedules based on known consumable levels and maximize delivery efficiency by filling consumables fully on each delivery. When the consumable is refilled the amount of the fill is uploaded to the Software unit 600 via the web portal of API interface and when the next invoice is generated for that customer the estimated usage since the last delivery is compared to the known delivery amount and a debit or credit of any difference is issued on the invoice. This ensures that the customer account is balanced each time a delivery occurs.

Figure 1B:
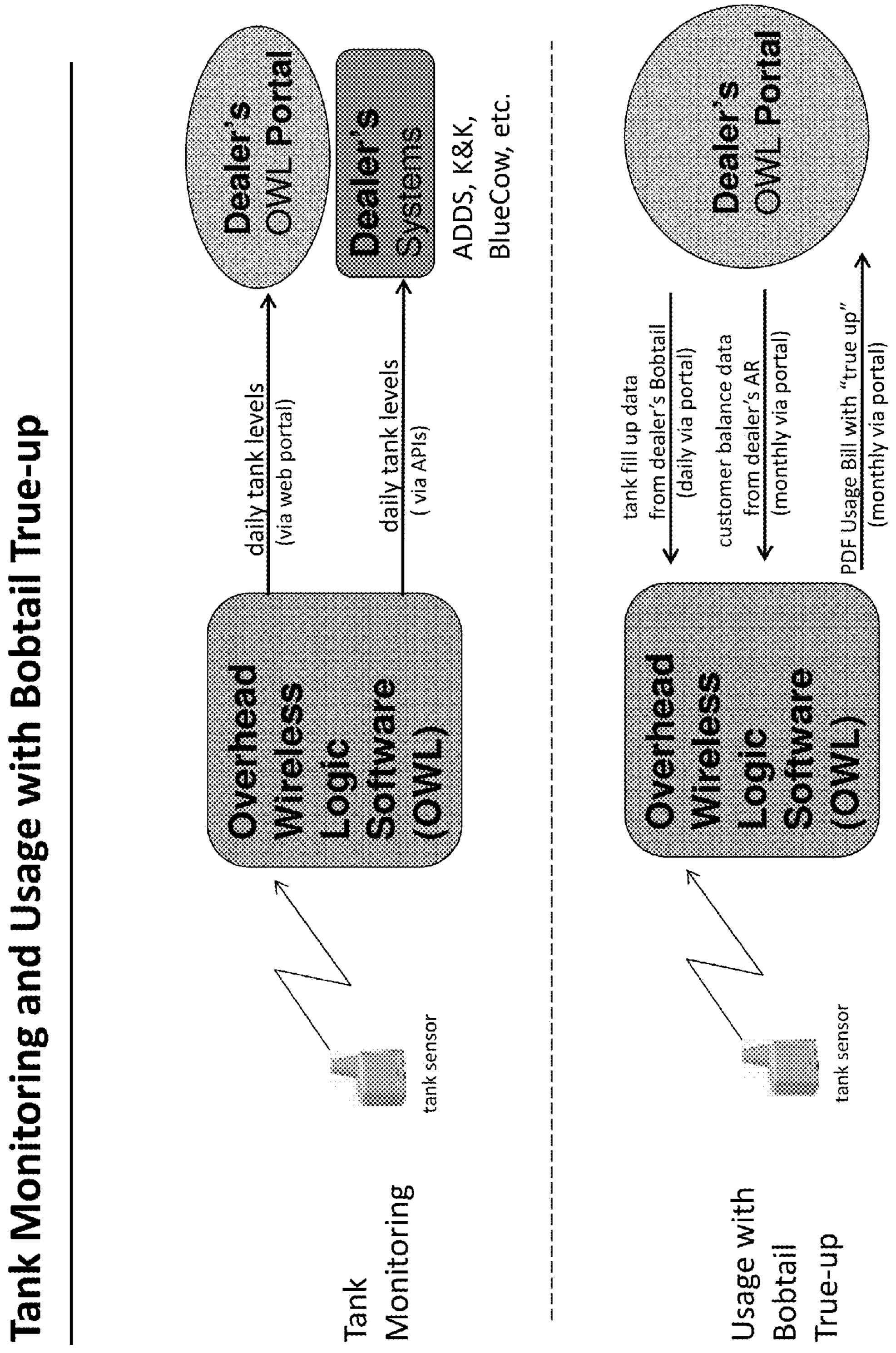
FIG. 1B is a block diagram of the interfaces between the tank sensor, the software, and the users in an embodiment.

FIG. 1B illustrates the interfacing between the tank sensor, the software of the system, and the users. The tank sensor provides data to the software. The backend provides daily tanks level to the web portal front end interface and/or daily tank levels via API's to a dealer's proprietary system. For usage based billing, the backend software receives tank fill data from the dealer's Bobtail (periodically such as daily via the front end portal). The backend software also receives customer balance data from a dealer's accounting information (periodically such as monthly via the front-end portal). The backend software processes the tank sensor data with the dealer data to provide periodic (such as monthly) usage billing with reconciliation.

Figure 2:
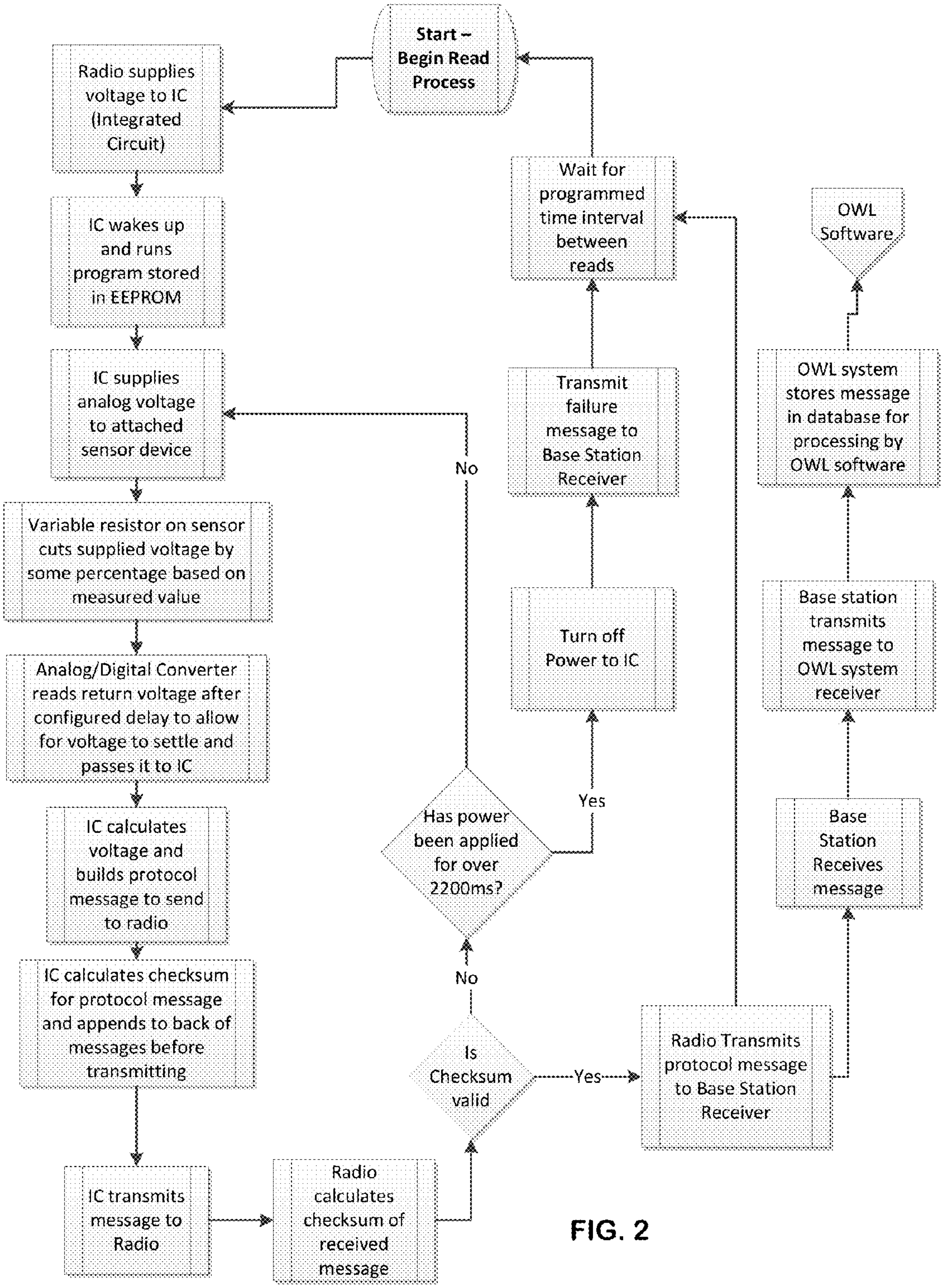
FIG. 2 illustrates a flowchart of the processing for an interface chip of an embodiment.

In operation, an embodiment of the system is adapted to execute the following processes with reference to FIGS. 2-4. With reference to FIG. 2, the process starts with the beginning of a read processes. A radio supplies voltage to a processing device 100 such as an integrated circuit. The IC wakes up and runs a program stored in EEPROM. The IC supplies analog voltage to a sensor device 300 in communication therewith. A variable resistor on the sensor cuts supplied voltage by a predetermined percentage based on a measured value. An A/D converter reads the return voltage after a preconfigured delay to allow for the voltage to settle and passes the return voltage to the IC. The IC calculates the voltage and builds predetermined protocol message for communication, such as via a radio. The IC can also calculate a predetermined checksum for the protocol message and appends it to the back of the message before transmitting. The IC transmits the message to the communication interface, such as a radio. The radio calculated the checksum of the received message.

If the checksum is valid, the radio transmits the protocol message to a base station receiver which is then transmitted to a central system where the message is stored in a database for further processing by a program adapted to manage usage of the storage tank consumables, hereinafter referred to as OWL software. Otherwise, if the checksum is not valid, a check is made as to whether power has been applied for a predetermined period of time such as 2200 ms. If not, the process returns to the IC supplying voltage to the sensor device. If so, power is turned off to the IC, a failure message is transmitted to the base station receiver, and a programmed time interval is waited for between reads and then the read process begins again.

Figure 3A:
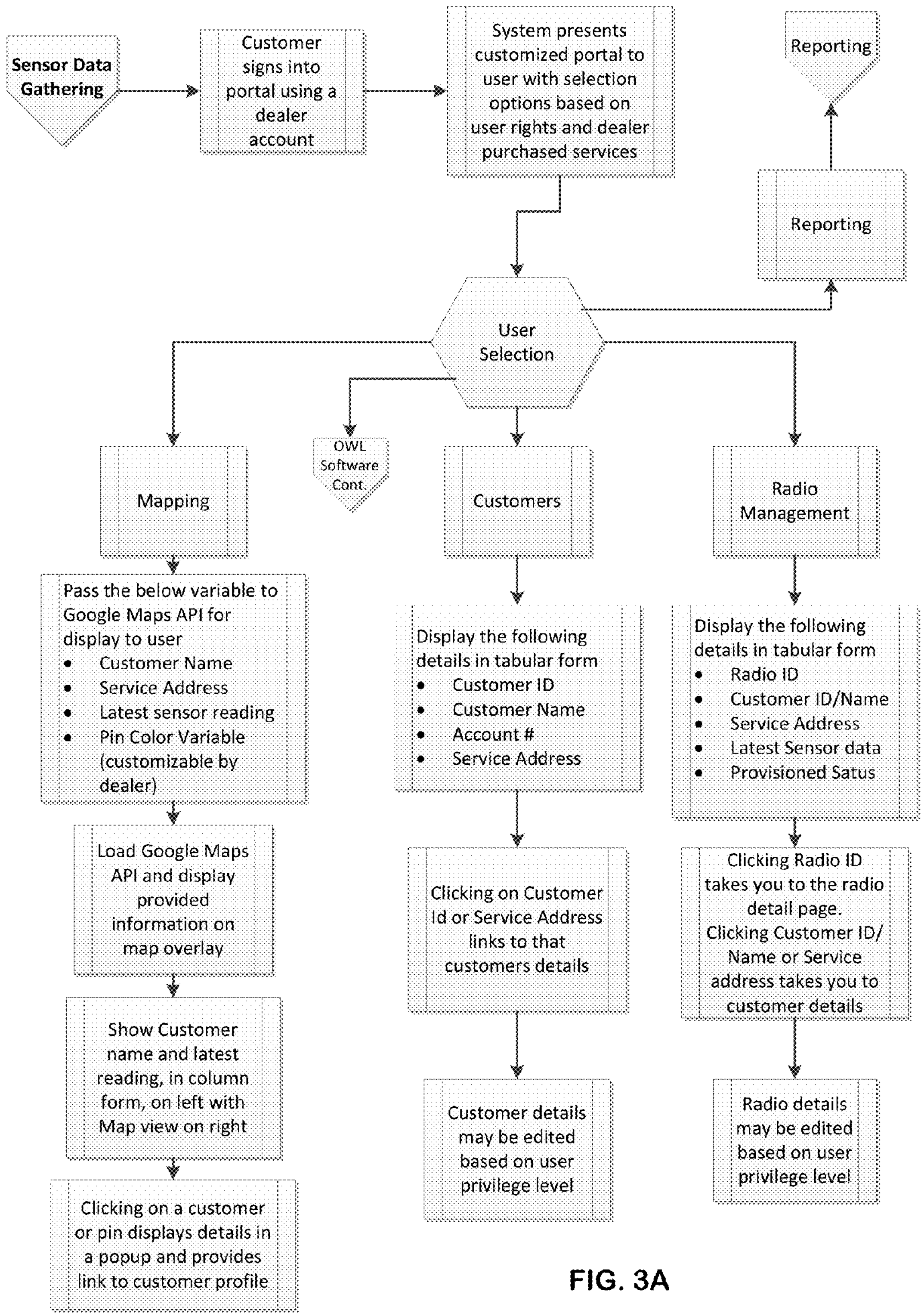
FIG. 3A-3B illustrates a flowchart of server software for web portal of an embodiment.
Figure 3B:
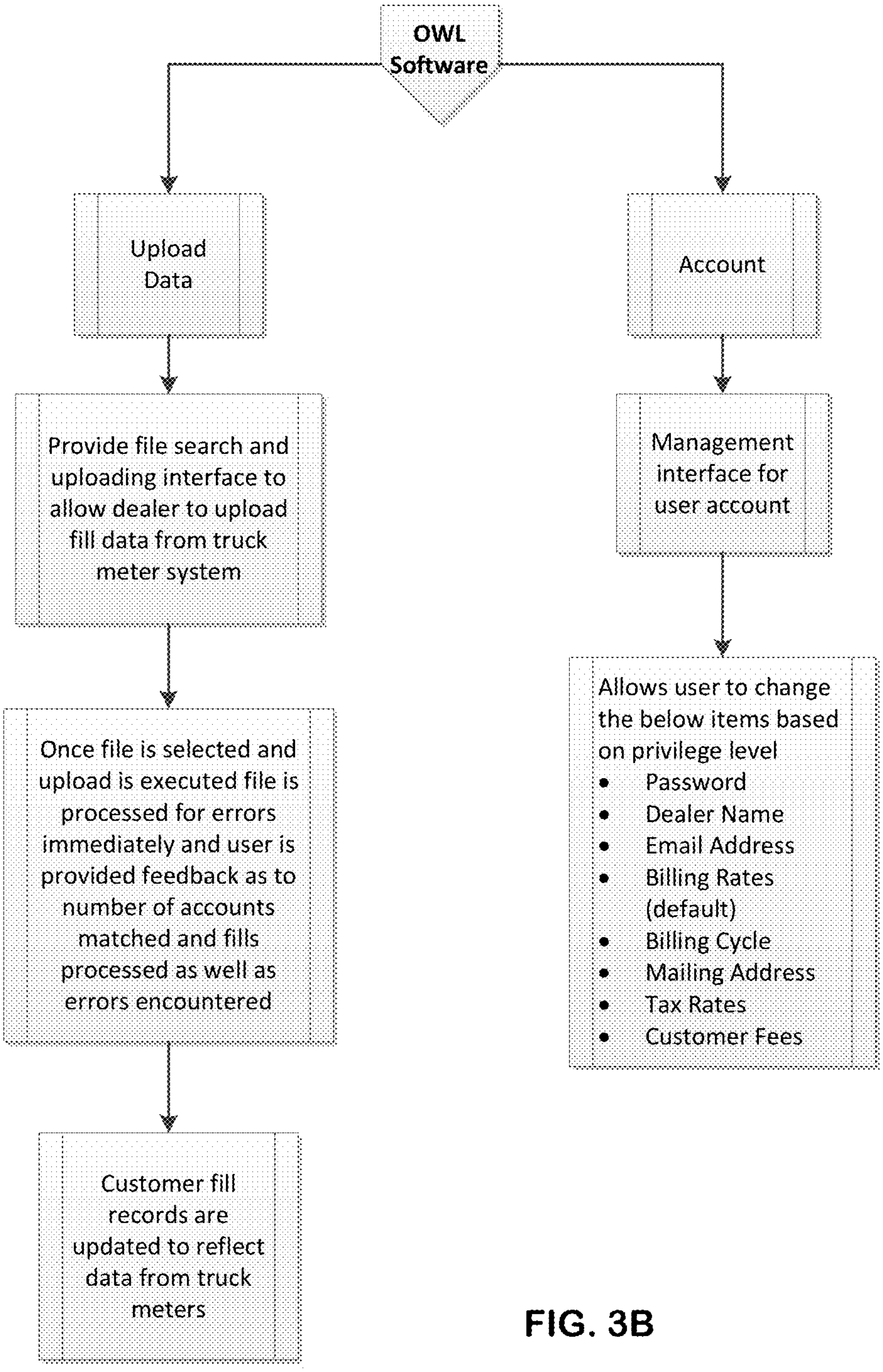

Turning now to FIG. 3A-3B, the processing via the OWL software will now be described by example. The OWL software preferably provides a customized portal to users with selection options based on user rights and dealer purchased services. From this portal, the user can select from one or more of the following based on user rights: Mapping, Reporting, Radio Management, Customers, Upload Data, and Account. Each of these will be described by way of example below.

Figure 5A:
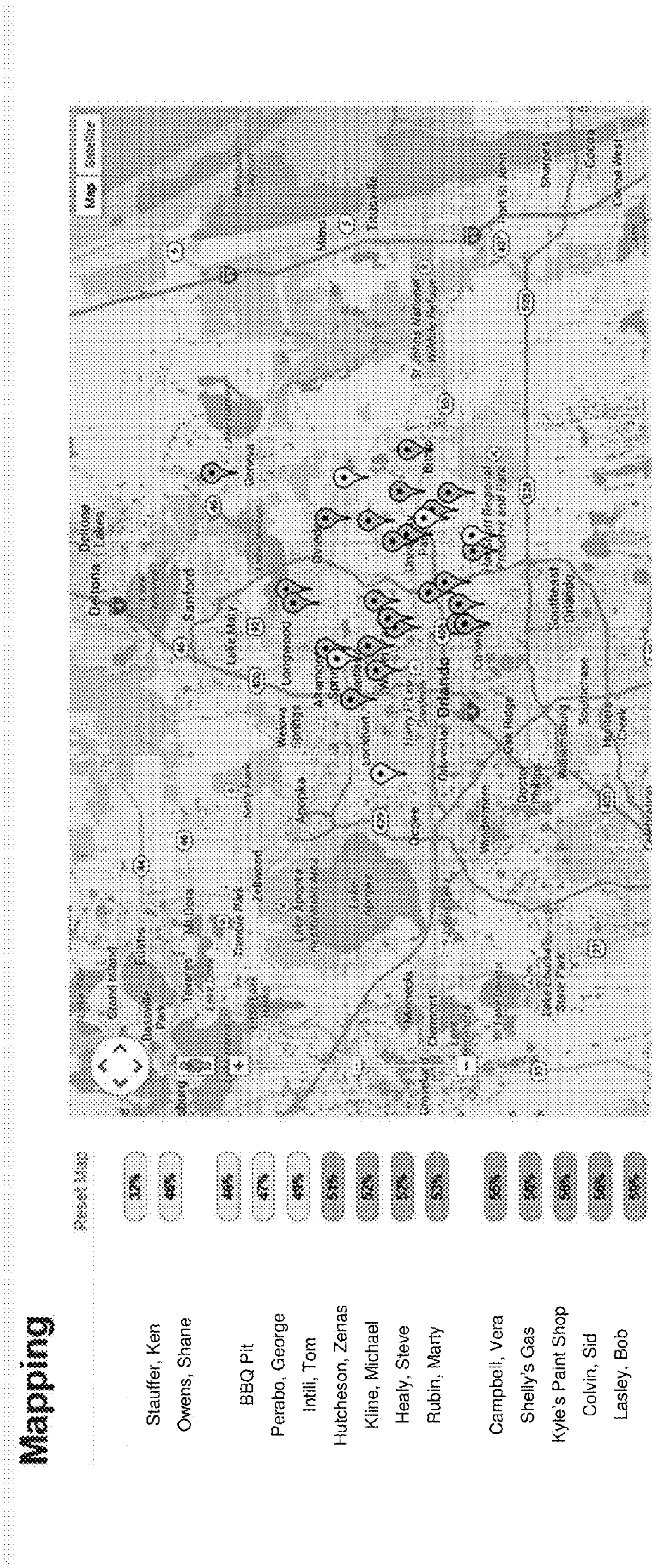
FIGS. 5A-5C depict a number of screen shot examples in certain embodiments.

The Mapping selection, detailed in FIG. 3A, is adapted to provide geographic/location information to the user. This can be accomplished, for example, by passing variables to a mapping program such as Google Maps API for display to the user. The variables comprise, for example, customer name, service address, latest sensor reading, and a pin color variable (customizable by the dealer). Thereafter, the map API is loaded in order to display the provided information on a map overlay. In an embodiment, the customer name and latest reading can be shown in column form in one part of the display with the map view on the other (See FIG. 5A as an example map view). The mapping selection is preferably adapted to provide for additional information such as allowing the user to click on a customer or pin which displays details in a popup and provides a link to the customer profile.

The Customers selection, detailed in FIG. 3A, is adapted to provide customer details. This can be accomplished, for example, by providing an interface display, in tabular form for example, with the following information: Customer ID, Customer Name, Account Number, and Service Address. Selecting the information links to those details and allows editing based on privilege level.

The Radio Management selection, detailed in FIG. 3A, is adapted to provide management of the radio information. This can be accomplished, for example, by providing an interface display, in tabular form for example, with the following information: Radio ID, Customer ID/Name, Service Address, Latest Sensor Data, Provisioned Status. Selecting the information links to those details and allows editing based on privilege level.

The Upload Data selection detailed in FIG. 3B, is adapted to provide an interface for uploading fill data from the truck metering system. This can be accomplished, for example, by providing a file search and upload interface to allow the dealer to upload fill data from the truck meter system. Once a file is selected and the upload is executed, the file is processed for errors and the user is provided feedback as to the number of accounts matched and fills processed as well as errors encountered. The customer fill records are updated to reflect data from truck meters.

The Account selection, detailed in FIG. 3B, is adapted to provide a management interface for user accounts. This can be accomplished, for example, by providing an interface for a user to edit/change information based on privilege level, such as one or more of the following: Password, Dealer Name, Email Address, Billing Rates (with defaults), Billing Cycle, Mailing Address, Tax Rates, Customer Fees, and the like.

Figure 4A:
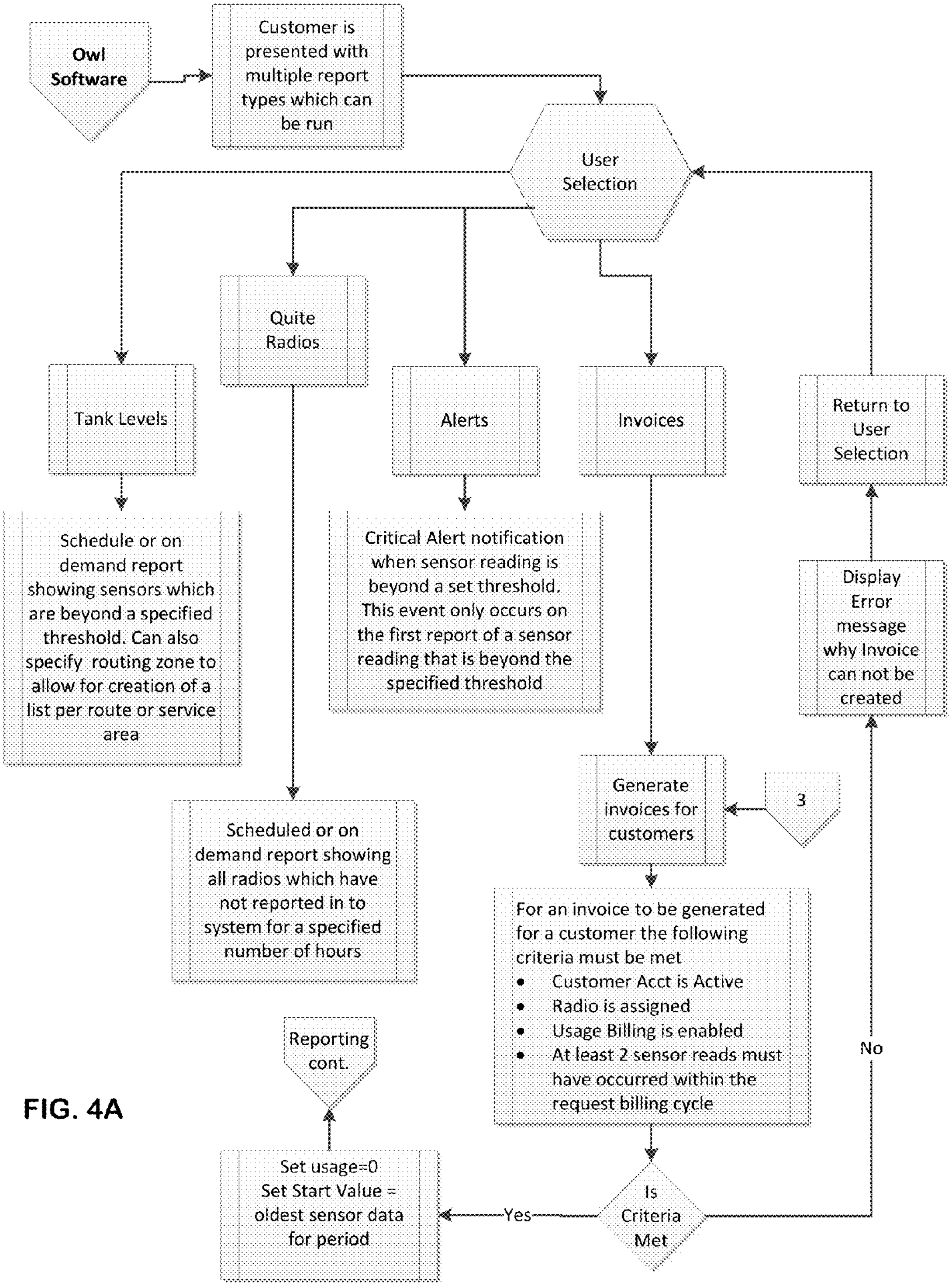
FIGS. 4A-4B illustrate a flowchart of reporting and usage based billing software of an embodiment.
Figure 4B:
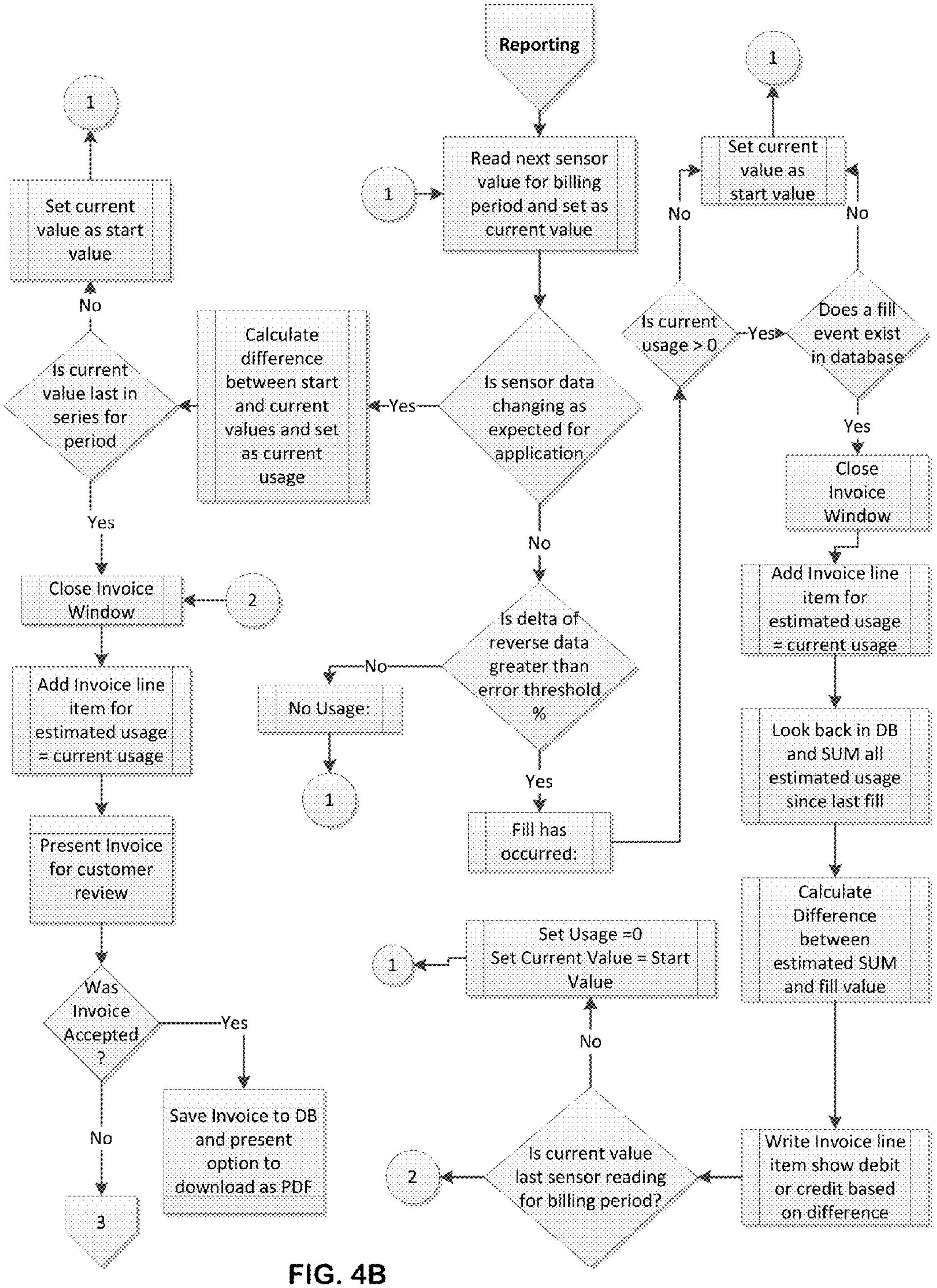
Figure 5B:
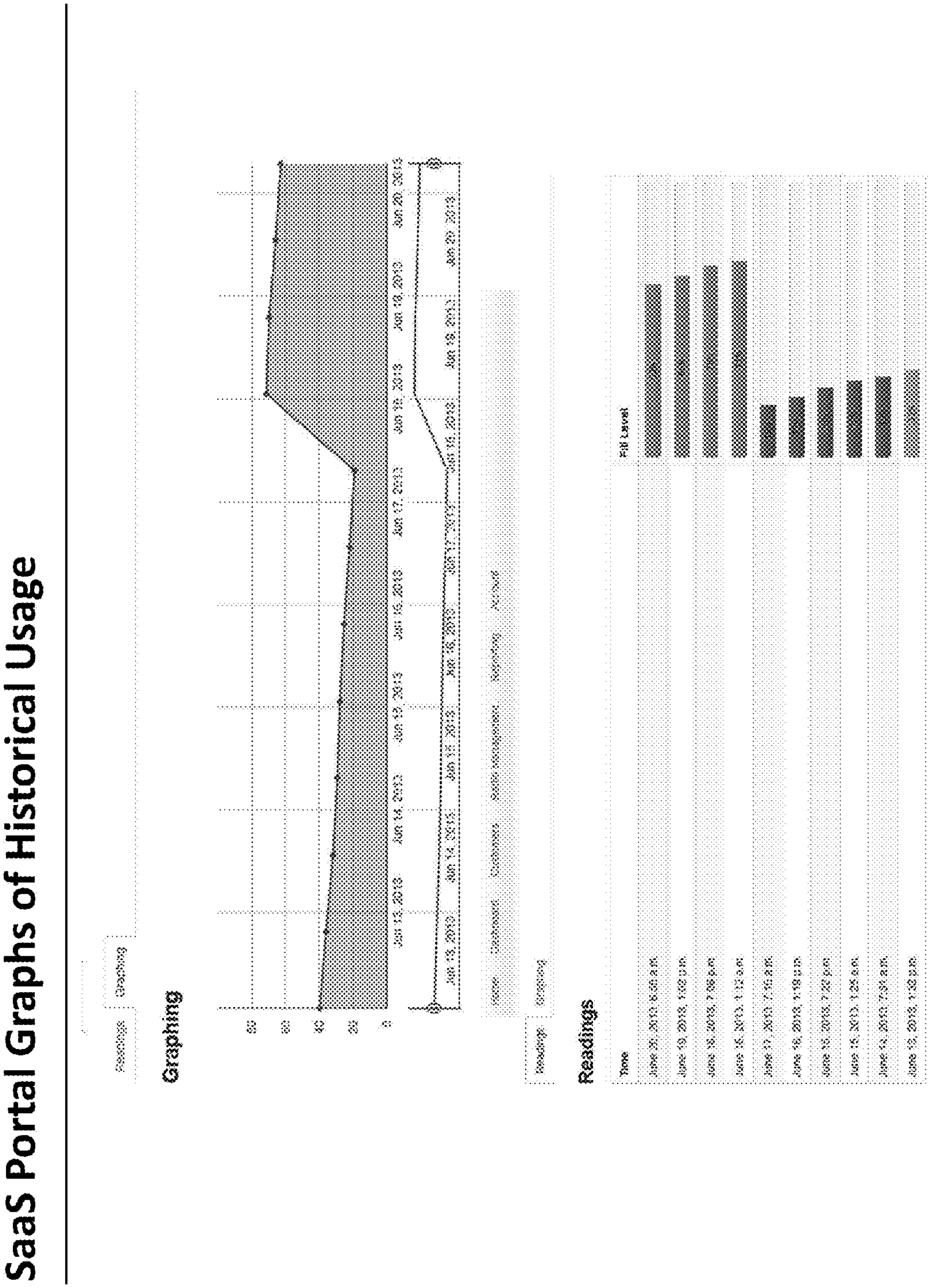

The Reporting selection, detailed in FIG. 4A-4B is adapted to provide multiple report types which can be executed. For example, the user can select reports such as Tank Levels, Quiet Radios, Alerts, and Invoices. See FIG. 5B as an example report of historical usage.

The Tank Levels report is adapted to provide schedule or on demand reports showing sensors which are beyond a specified threshold. This report can also provide a specified routing zone to allow for creation of a list per route or service area.

The Quiet Radios report is adapted to provide scheduled or on demand reports showing all radios which have not reported in to the system for a specified number of hours. This is helpful with troubleshooting and identifying malfunctions.

The Alerts report is adapted to provide critical alert information when sensor reading is beyond a predetermined threshold. This event can be programmed to occur on the first report of a sensor reading that is beyond the predetermined threshold.

Figure 5C:
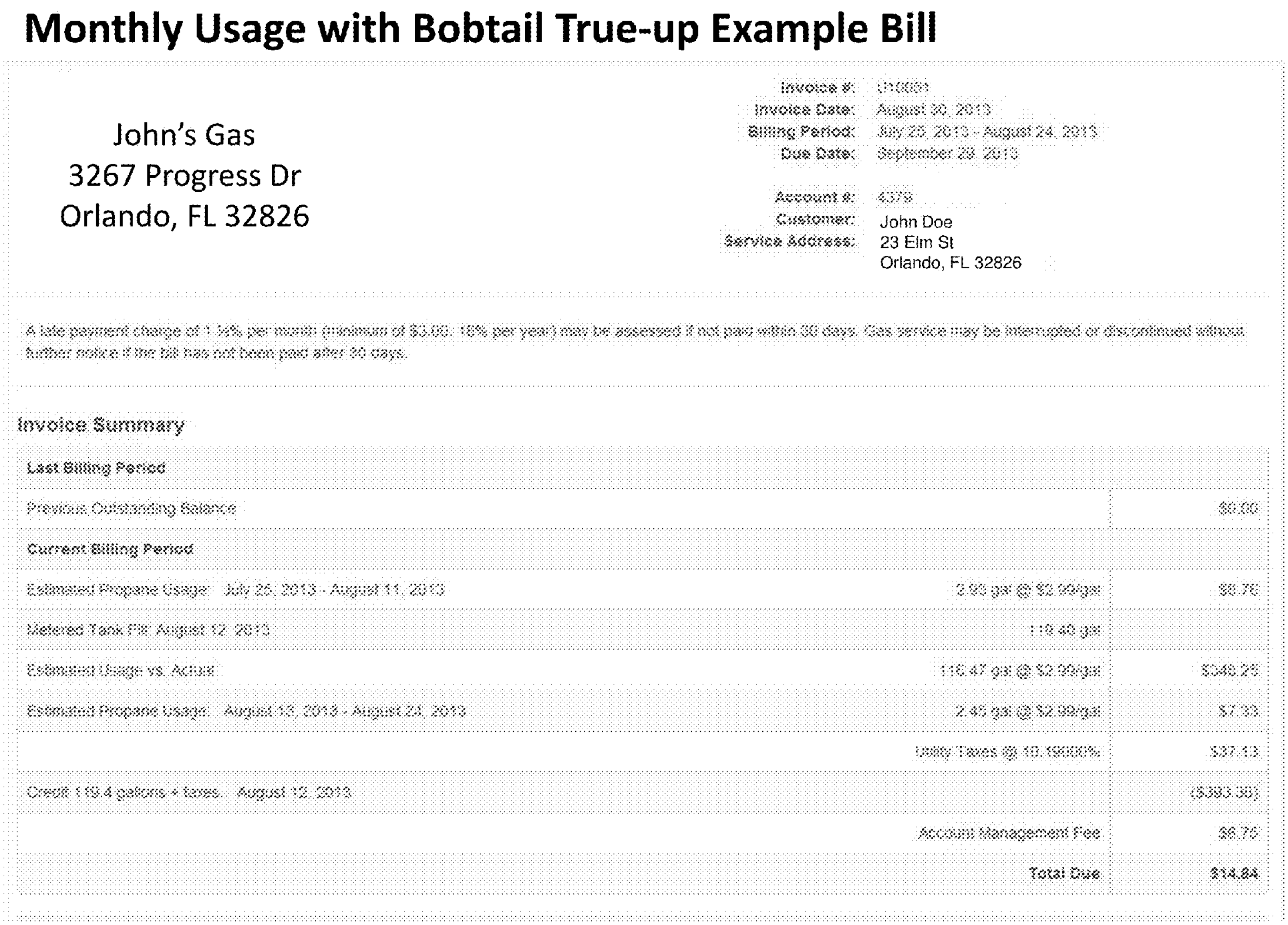

The Invoices report is adapted to provide custom invoices for customers based on usage levels (See FIG. 5C as an example invoice). This report is adapted to generate invoices for a customer based on criteria such as: Customer Account is active, radio is assigned, usage billing is enabled, a predetermined number of sensor reads (such as 2) have occurred within the requested billing cycle. If the criteria are not met, an error message can be displayed and the user can be returned to the user selection menu. If the criteria are met, the usage based billing process is executed.

The usage based billing process will now be exampled using the example flowchart of FIG. 4B. Initially, the current usage is set to zero and the start value is set to the oldest sensor data for the period. The next sensor value for the billing period is read and set as the current value. The sensor data is checked to see if it is changing as expected for the application. If so, the difference between the start and current values is calculated and added to current usage. If the current value is not the last in series for the period, then the current value is set to the start value and the process returns the next sensor value for the billing period being read and sets it as the current value then repeats the calculation. If the current value is the last in series for the period, then a Close Invoice Window process is executed wherein an invoice line item is added for estimated usage equal to current usage, the invoice is presented for review. If the invoice is not accepted, the process returns to the Generate Invoices for Customers process. If the invoice is accepted, the invoice is saved to the database and an option is presented for downloading (such as a PDF).

If the sensor data checked is not changing as expected for the application, the change is compared to a predetermined threshold. If it is not greater than the threshold, then there is no usage and the process returns the next sensor value for the billing period being read and sets it as the current value. If it is greater than the threshold, then a fill has occurred. The process continues to check if the current usage is greater than zero. If not, the current value is set as the start value, and the process returns to reading the next sensor value for the billing period. If the current usage is greater than zero, the processes checks to see if a fill event exists in the database (if not, the current value is set as the start value, and the process returns to reading the next sensor value for the billing period).

If a fill event exists in the database, then a Close Invoice Window process is executed wherein an invoice line item is added for estimated usage equal to current usage. The process then looks back into the database to sum all the estimated usage since the last fill. It calculates the difference between the estimated sum and the fill value. With this calculation, an invoice line item is added to show a debit or credit based on the difference in order to reconcile the estimated usage with the actual usage. If the current value is the last sensor reading for a billing period, the process continues to the Close Invoice Window process wherein an invoice line item is added for estimated usage equal to current usage, the invoice is presented for review. If the invoice is not accepted, the process returns to the Generate Invoices for Customers process. If the invoice is accepted, the invoice is saved to the database and an option is presented for downloading (such as a PDF). If the current value is not the last sensor reading for a billing period, the process sets current usage to zero, sets current value to start value, and returns to reading the next sensor value for the billing period.

An exemplary system for implementing software aspects of the invention includes a computing device or a network of computing devices. In a basic configuration, computing device may include any type of stationary computing device or a mobile computing device. Computing device typically includes at least one processing unit and system memory. Depending on the exact configuration and type of computing device, system memory may be volatile (such as RAM), non-volatile (such as ROM, flash memory, and the like) or some combination of the two. System memory typically includes operating system, one or more applications, and may include program data. Computing device may also have additional features or functionality. For example, computing device may also include additional data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules or other data. System memory, removable storage and non-removable storage are all examples of computer storage media. Non-transitory computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other physical medium which can be used to store the desired information and which can be accessed by computing device. Any such computer storage media may be part of device. Computing device may also have input device(s) such as a keyboard, mouse, pen, voice input device, touch input device, etc. Output device(s) such as a display, speakers, printer, etc. may also be included. Computing device also contains communication connection(s) that allow the device to communicate with other computing devices, such as over a network or a wireless network. By way of example, and not limitation, communication connection(s) may include wired media such as a wired network or direct-wired connection, and wireless media such as acoustic, RF, infrared and other wireless media.

Computer program code for carrying out operations of the invention described above may be written in a high-level programming language, such as C or C++, for development convenience. In addition, computer program code for carrying out operations of embodiments of the present invention may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller. A code in which a program of the present invention is described can be included as a firmware in a RAM, a ROM and a flash memory. Otherwise, the code can be stored in a tangible computer-readable storage medium such as a magnetic tape, a flexible disc, a hard disc, a compact disc, a photo-magnetic disc, a digital versatile disc (DVD). The present invention can be configured for use in a computer or an information processing apparatus which includes a memory, such as a central processing unit (CPU), a RAM and a ROM as well as a storage medium such as a hard disc.

The "step-by-step process" for performing the claimed functions herein is a specific algorithm, and may be shown as a mathematical formula, in the text of the specification as prose, and/or in a flow chart. The instructions of the software program create a special purpose machine for carrying out the particular algorithm. Thus, in any means-plus-function claim herein in which the disclosed structure is a computer, or microprocessor, programmed to carry out an algorithm, the disclosed structure is not the general purpose computer, but rather the special purpose computer programmed to perform the disclosed algorithm.

A general purpose computer, or microprocessor, may be programmed to carry out the algorithm/steps of the present invention creating a new machine. The general purpose computer becomes a special purpose computer once it is programmed to perform particular functions pursuant to instructions from program software of the present invention. The instructions of the software program that carry out the algorithm/steps electrically change the general purpose computer by creating electrical paths within the device. These electrical paths create a special purpose machine for carrying out the particular algorithm/steps.

Unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

It should be understood that the examples and embodiments described herein are for illustrative purposes only and that various modifications or changes in light thereof will be suggested to persons skilled in the art and are to be included within the spirit and purview of this application.

We claim:

1. A method for managing usage of storage tank consumables in a storage tank, comprising:

receiving and storing by a central server comprising a processor and a storage device, measurements of storage tank consumables from a remote system associated with a storage tank;

periodically calculating by the processor usage-based data for generating invoices for storage tank consumables based on sensor measurements representative of an estimated usage of the storage tank consumables;

receiving and storing by the central server a fill value representing an actual usage reported to the central server when the storage tank is filled;

reconciling the estimated usage with the actual usage by the processor by summing all estimated usages since a last fill of the storage tank, calculating a difference between the sum of the estimated usages and the fill value, and issuing a debit or credit based on the difference for reconciliation; and providing storage tank consumable data and customer data graphically via a map displayed on a display device for one or more storage tanks managed by the central server, by generating via the processor a map view comprising icons overlaid on the map based on service addresses, wherein the icons provide selectable links to the storage tank consumable data and customer data, and further wherein the icons are color coded to be indicative of tank level readings.

2. The method of claim 1, further comprising:

measuring storage tank consumables via a sensor device of the remote system adapted to measure usage of the storage tank consumables.

3. The method of claim 2, further comprising:

processing the sensor measurements by a processing device in communication with the sensor device, wherein the processing device is adapted to convert the sensor measurements into a predetermined protocol message for transmission.

4. The method of claim 3, further comprising:

communicating between the central server and the remote system via a communication interface adapted to transmit the predetermined protocol message.

5. The method of claim 1, further comprising:

providing a user interface adapted to grant access to data stored and processed by the central server and provide reports based on the data.

6. The method of claim 1, further comprising:

generating via the processor tank level reports for one or more storage tanks managed by the central server, wherein the tank level reports are adapted to report data that exceeds certain predetermined thresholds and generate a report based on routing zones for tank filling routes.

7. The method of claim 1, further comprising:

periodically generating via the processor invoices based on the estimated usage of the storage tank consumables to allow for a plurality of billing cycles between tank fills;

wherein after the storage tank is filled, adjusting the next invoice via the processor in order to reconcile the estimated usage with the actual usage.

8. A non-transitory computer readable medium containing instructions that when executed by a processor perform acts comprising:

receiving and storing by a processor and storage device of a central server measurements of storage tank consumables from a remote system located at a storage tank;

periodically calculating by the processor usage-based data for generating invoices for storage tank consumables based on sensor measurements representative of an estimated usage of the storage tank consumables;

receiving and storing a fill value representing an actual usage reported to the central server when the storage tank is filled;

reconciling by the processor the estimated usage with the actual usage by summing all estimated usages since a last fill of the storage tank, calculating a difference between the sum of the estimated usages and the fill value, and issuing a debit or credit based on the difference for reconciliation; and providing storage tank consumable data and customer data graphically via a map displayed on a display device for one or more storage tanks managed by the central server, by generating via the processor a map view comprising icons overlaid on the map based on service addresses, wherein the icons provide selectable links to the storage tank consumable data and customer data, and further wherein the icons are color coded to be indicative of tank level readings.

9. The non-transitory computer readable medium of claim 8, further comprising instructions that when executed by a processor perform acts comprising:

processing sensor measurements by a processing device in communication with a sensor device of the remote system adapted to measure usage of the storage tank consumables, wherein the processing device is adapted to convert the sensor measurements into a predetermined protocol message for transmission.

10. The non-transitory computer readable medium of claim 8, further comprising instructions that when executed by a processor perform acts comprising:

generating tank level reports for one or more storage tanks managed by the central server, wherein the tank level reports are adapted to report data that exceeds certain predetermined thresholds and generate a report based on routing zones for tank filling routes.

11. The non-transitory computer readable medium of claim 8, further comprising instructions that when executed by a processor perform acts comprising:

periodically generating invoices based on the estimated usage of the storage tank consumables to allow for a plurality of billing cycles between tank fills;

wherein after the storage tank is filled, adjusting the next invoice in order to reconcile the estimated usage with the actual usage.

12. A system for managing usage of storage tank consumables in a storage tank, comprising:

a central server comprising a processor and a database adapted to communicate with a processing device of a remote system associated with the storage tank through a communication interface, wherein the processed sensor measurements of the remote system are received by the central server for further processing and storage, wherein the further processing comprises executing a usage based billing process adapted to:

periodically calculate usage-based data for generating invoices for storage tank consumables based on sensor measurements representative of an estimated usage of the storage tank consumables;

receive and store a fill value representing an actual usage reported to the central server when the storage tank is filled;

reconcile the estimated usage with the actual usage by summing all estimated usages since a last fill of the storage tank, calculating a difference between the sum of the estimated usages and the fill value, and issuing a debit or credit based on the difference for reconciliation; and provide storage tank consumable data and customer data graphically via a map displayed on a display device for one or more storage tanks managed by the central server, by generating via the processor a map view comprising icons overlaid on the map based on service addresses, wherein the icons provide selectable links to the storage tank consumable data and customer data, and further wherein the icons are color coded to be indicative of tank level readings.

13. The system of claim 12, further comprising:

a remote system associated with the storage tank comprising:

a sensor device unit adapted to measure storage tank consumables;

a processing device in communication with the sensor device adapted process sensor measurements; and a communication interface.

14. The system of claim 13, wherein the processing device of the remote system is further adapted to convert the sensor measurements into a predetermined protocol message for transmission via the communication interface.

15. The system of claim 12, wherein the usage based billing process is further adapted to:

generate tank level reports for one or more storage tanks managed by the central server, wherein the tank level reports are adapted to report data that exceeds certain predetermined thresholds and generate a report based on routing zones for tank filling routes.

16. The system of claim 12, wherein the usage based billing process is further adapted to:

periodically generate invoices based on the estimated usage of the storage tank consumables to allow for a plurality of billing cycles between tank fills;

wherein after the storage tank is filled, the usage based billing process is further adapted to adjust the next invoice in order to reconcile the estimated usage with the actual usage.

17. The system of claim 12, wherein the usage based billing process is further adapted to generate monthly invoices based on the estimated usage of the storage tank consumables and wherein after the storage tank is filled, the usage based billing process is further adapted to adjust the next monthly invoice in order to reconcile the estimated usage with the actual usage.

* * * * *